(12) United States Patent
Andres et al.

(10) Patent No.: US 11,755,069 B2
(45) Date of Patent: Sep. 12, 2023

(54) APPARATUS UTILIZING AND METHOD OF PARTIAL LAMINATION FOR A SEAMLESS INTERFACE WITH TOUCHSCREEN FUNCTIONALITY

(71) Applicants: Marlon Andres, Chino, CA (US); David Padilla, Fontana, CA (US)

(72) Inventors: Marlon Andres, Chino, CA (US); David Padilla, Fontana, CA (US)

(73) Assignee: ATA INDUSTRIES, Chino, CA (US)

( * ) Notice: Subject to any disclaimer, the term of this patent is extended or adjusted under 35 U.S.C. 154(b) by 268 days.

(21) Appl. No.: 17/082,712

(22) Filed: Oct. 28, 2020

(65) Prior Publication Data

US 2022/0132046 A1   Apr. 28, 2022

(51) Int. Cl.
*G06F 1/16* (2006.01)
*A47G 1/17* (2006.01)
*H04N 1/00* (2006.01)
*A45C 11/00* (2006.01)

(52) U.S. Cl.
CPC ............ *G06F 1/1626* (2013.01); *A45C 11/00* (2013.01); *A47G 1/17* (2013.01); *H04N 1/00289* (2013.01); *A45C 2011/002* (2013.01)

(58) Field of Classification Search
CPC . G06F 1/1626; A45C 11/00; A45C 2011/002; A47G 1/17; H04N 1/00289
See application file for complete search history.

(56) References Cited

U.S. PATENT DOCUMENTS

| | | | |
|---|---|---|---|
| 6,152,551 A | 11/2000 | Annas | |
| 9,323,133 B1* | 4/2016 | Matriano | G03B 17/53 |
| 2011/0018981 A1* | 1/2011 | White | H04N 13/30 |
| | | | 348/54 |
| 2014/0375828 A1* | 12/2014 | Miller | H04N 1/00289 |
| | | | 348/207.11 |
| 2017/0118385 A1* | 4/2017 | Vargas | G03B 15/03 |
| 2018/0176460 A1 | 6/2018 | Telem | |
| 2019/0384143 A1* | 12/2019 | Lynch | G03B 17/53 |
| 2020/0068105 A1* | 2/2020 | Telem | H04N 5/2252 |

FOREIGN PATENT DOCUMENTS

CN    110489019 A   * 11/2019

* cited by examiner

*Primary Examiner* — Keith Ferguson
(74) *Attorney, Agent, or Firm* — Trojan Law Offices

(57) ABSTRACT

A seamless interface with touchscreen functionality and the method of manufacture are disclosed. An apparatus utilizing the seamless interface with touchscreen functionality, and a method of manufacturing the apparatus are similarly disclosed. The seamless interface has a front member, adhesive means, and a support member with an opening. The apparatus includes a touchscreen device, a rear member, and the seamless interface. The rear member secures the touchscreen device in the opening of the support member, which thereby contacts the front member of the seamless interface. Partially laminating the front member with the support member having an opening utilizing an adhesive means creates the seamless interface. This design enables the touchscreen functionality of the touchscreen device placed behind the front member to transfer through the front member, thereby allowing a user to communicate with the touchscreen device through the seamless interface.

18 Claims, 4 Drawing Sheets

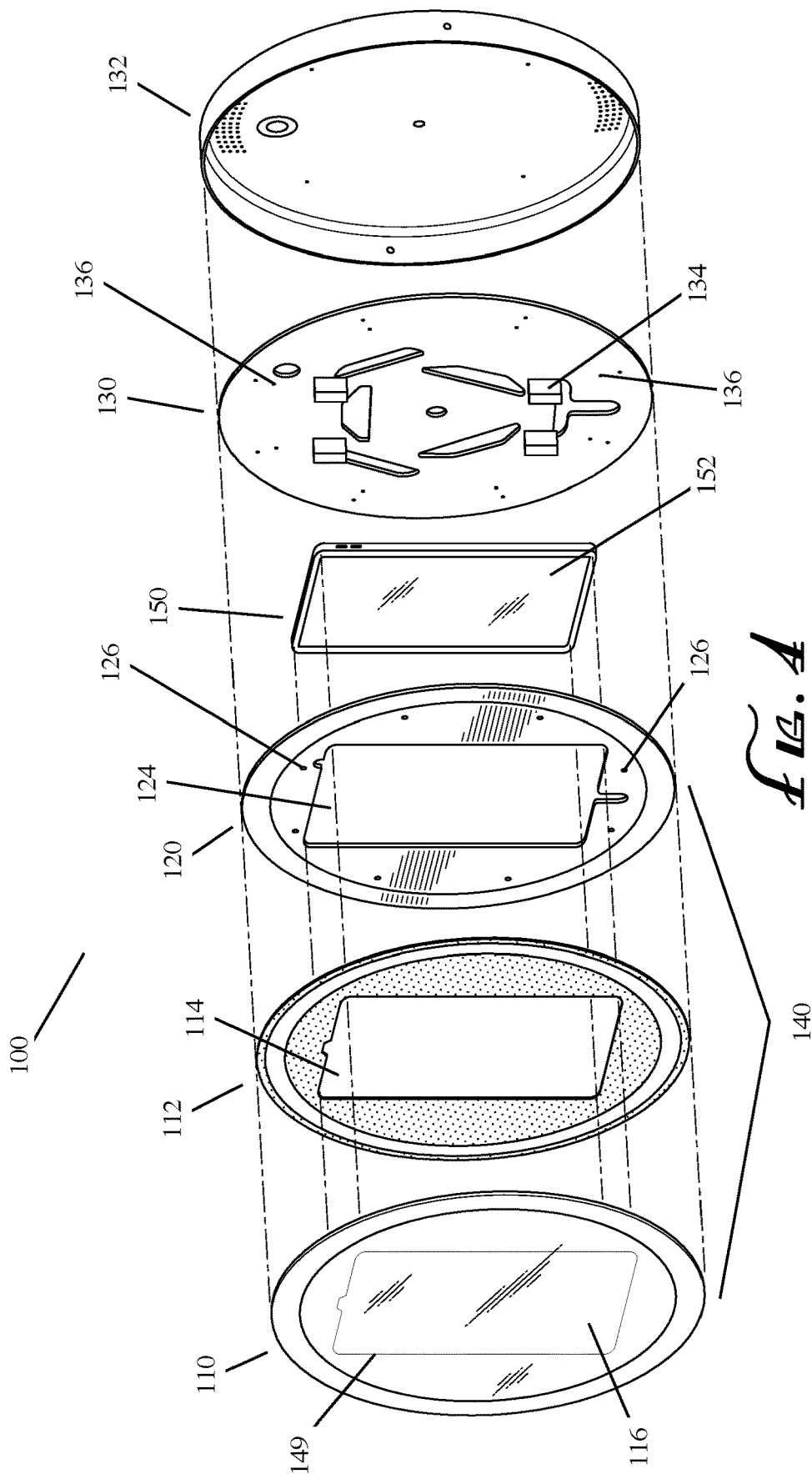

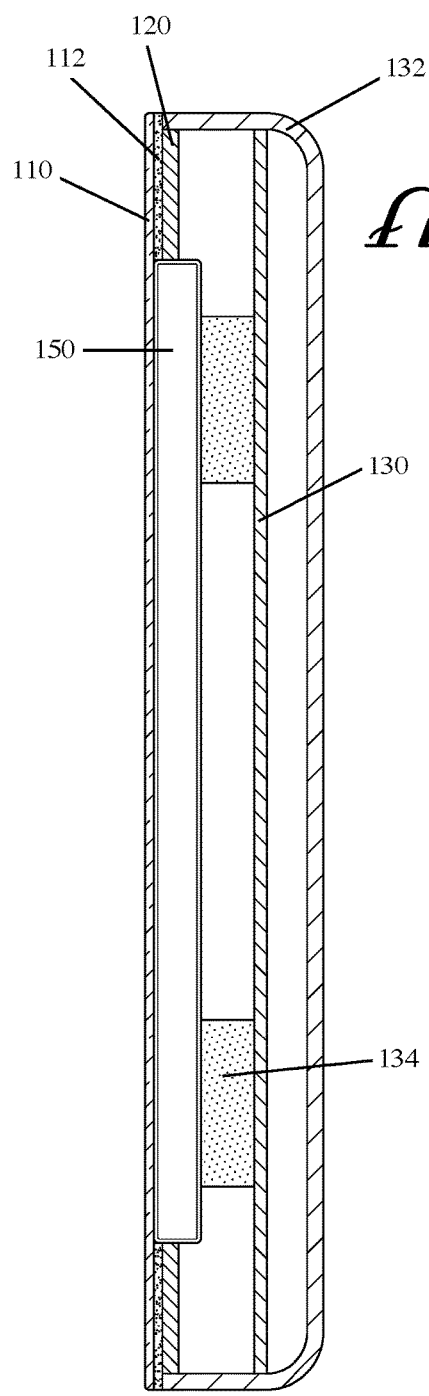
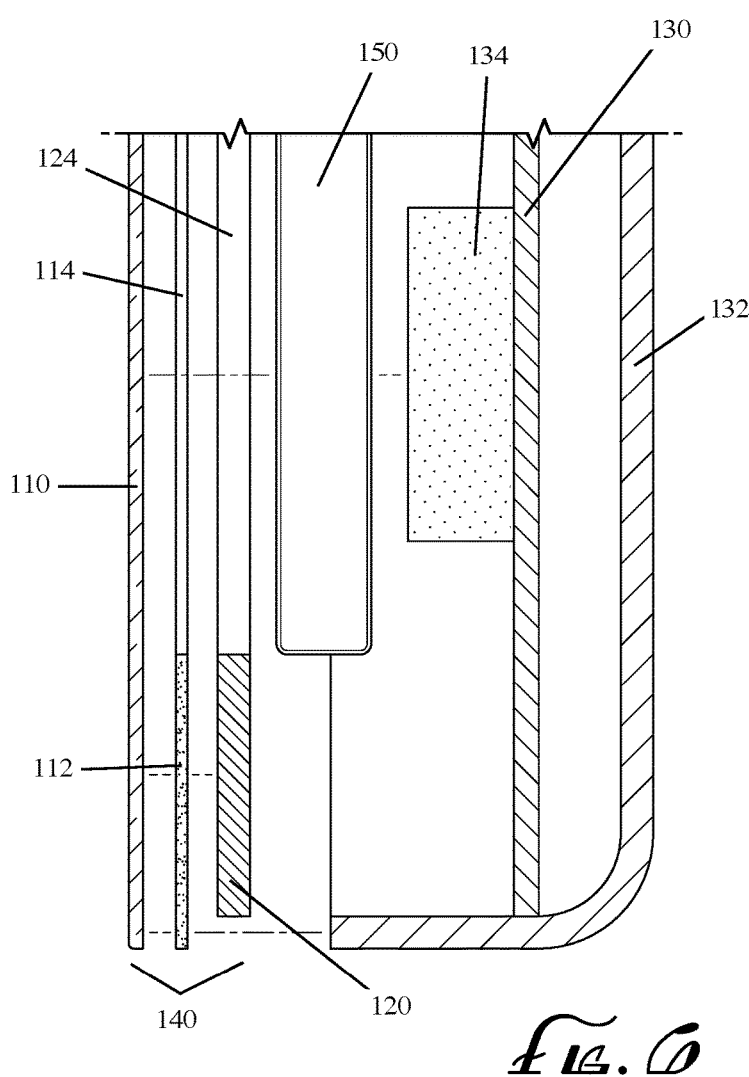

APPARATUS UTILIZING AND METHOD OF PARTIAL LAMINATION FOR A SEAMLESS INTERFACE WITH TOUCHSCREEN FUNCTIONALITY

FIELD OF THE INVENTION

The present invention relates generally to a method for and apparatus utilizing a partial lamination technique for providing a seamless touchscreen interface which utilizes the existing touchscreen functionality of a touchscreen device.

BACKGROUND OF THE INVENTION

Devices with touchscreen capabilities are well known and widely used in today's society. Numerous electronic devices, such as smart phones, computers, and tablets, use touchscreens to allow the user to interact and give commands to a touchscreen device. While there are multiple methods for obtaining touchscreen functionality in touchscreen devices in general, they all generally require a user to contact the screen with a body part, usually a finger, to interact with the touchscreen device.

Many other apparatuses incorporate touchscreen devices into their design, thus enabling the apparatus to have a touchscreen enabled user interface. For example, portable photobooth apparatuses generally incorporate touchscreen tablets placed behind or flush with a glass interface to enable a user to take pictures of themselves. In order for a user to access the touchscreen device's touchscreen functionality while incorporated in an apparatus, the touchscreen interface of the touchscreen device must either be exposed, allowing the user to touch the touchscreen device directly, or placed behind a layer of plastic or glass with a touch-foil installed between the layer of plastic or glass and the touchscreen device.

Each approach to incorporating touchscreen devices into an apparatus have their own respective drawbacks. In apparatuses where the touchscreen interface of the touchscreen device is exposed, the touchscreen device cannot seamlessly fit into the apparatus. Furthermore, users directly touch the touchscreen interface of the touchscreen device, which can dirty or damage the touchscreen upon repeated use. Additionally, the lack of a seamless fit of the touchscreen device in the apparatus can create an unclean and unpleasant aesthetic to the apparatus.

A touch-foil is typically required to enable touchscreen functionality from behind a layer of glass or plastic in apparatuses where the touchscreen device is placed behind a layer of glass or plastic. The touch-foil is generally connected to the touchscreen device via a USB connection and requires a separate controller board that needs to be mounted somewhere in the apparatus. To make it functional, drivers need to be installed and calibrated to permit touchscreen capabilities behind the layer of glass or plastic. Touch-foils can be expensive, and require extra labor and time to install. Additionally, the touchscreen device will need additional software installed to be compatible with the touch-foil, and the touchscreen device will require numerous ports to render the touch-foil functional. Thus, there is a need for an apparatus utilizing the existing touchscreen functionality of a touchscreen device that does not require the additional hardware or software to be installed to access the touchscreen functionality of the touchscreen device.

Generally, reducing the thickness of the layer of glass or plastic in front of the touchscreen device could permit the touchscreen to function through the layer of glass or plastic. However, the layer of glass or plastic would need to be so thin that the layer of glass or plastic becomes too fragile for practical or commercial use. Thus, there is a need for a method of manufacturing and apparatus utilizing a low-cost, seamless, and durable interface designed to allow a user to utilize the touchscreen capabilities of the touchscreen device while mounted behind the interface.

SUMMARY OF THE INVENTION

The present invention relates to an apparatus utilizing partial lamination to create a seamless interface with touchscreen functionality. The present invention similarly relates to a method of partial lamination to create a seamless interface with touchscreen functionality. It is an object of the invention to create an apparatus utilizing a low-cost seamless interface with touchscreen capability designed to utilize the existing touchscreen functionality of a touchscreen device placed behind the seamless interface, as well as a method of manufacturing this apparatus.

An apparatus utilizing partial lamination to create a seamless interface with touchscreen functionality includes a touchscreen device, a rear member, and a seamless interface having a front member, adhesive means, and a support member with an opening. The seamless interface is created by partially laminating the front member with the support member having an opening, such that the seamless interface has a stiff, laminated portion surrounding a thin, non-laminated portion enabling touchscreen functionality through the non-laminated portion of the seamless interface. The touchscreen device is then positioned in the opening of the support member, and between the front member and rear member.

A method of manufacturing a seamless interface with touchscreen functionality includes manufacturing a front member and a support member with an opening. The next step is coating either the front member and/or the support member with an adhesive means where the front member and support member will come into contact. Then adhere the front member to the support member having an opening, thereby creating the seamless interface.

After the seamless interface is manufactured, the next step is positioning a touchscreen device into the opening of the support member such that the touchscreen portion of the touchscreen device contacts the front member. The next step is tightening a rear member to the opposing side of the support member from the front member. Thus, the touchscreen device is secured between the front member and the rear member and surrounded by the support member, such that the seamless interface has the same touchscreen functionality of the touchscreen device.

BRIEF DESCRIPTION OF THE DRAWINGS

These and other features and advantages of the present invention will become appreciated, as the same becomes better understood with reference to the specification, claims and drawings herein:

FIG. 4 is a schematic view of the apparatus of the exemplary embodiment of FIG. 1.

FIG. 5 is a side cross-section view of the apparatus of the exemplary embodiment of FIG. 1.

FIG. 6 is a schematic view of the side cross-section view of the apparatus of the exemplary embodiment of FIG. 1.

DETAILED DESCRIPTION OF THE INVENTION

The invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present there between. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section.

As used herein, the singular forms "a," "an," and "the," are intended to include the plural forms as well, unless the context clearly indicates otherwise. It will be further understood that the terms "comprises" and/or "comprising," "includes" and/or "including," and "have" and/or "having," when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom," and "upper" or "top," and "inner" or "outer," may be used herein to describe one element's relationship to another elements as illustrated in the Figures. It will be understood that relative terms are intended to encompass different orientations of the device in addition to the orientation depicted in the Figures.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

I. Description of the General Apparatus

Figure 1:
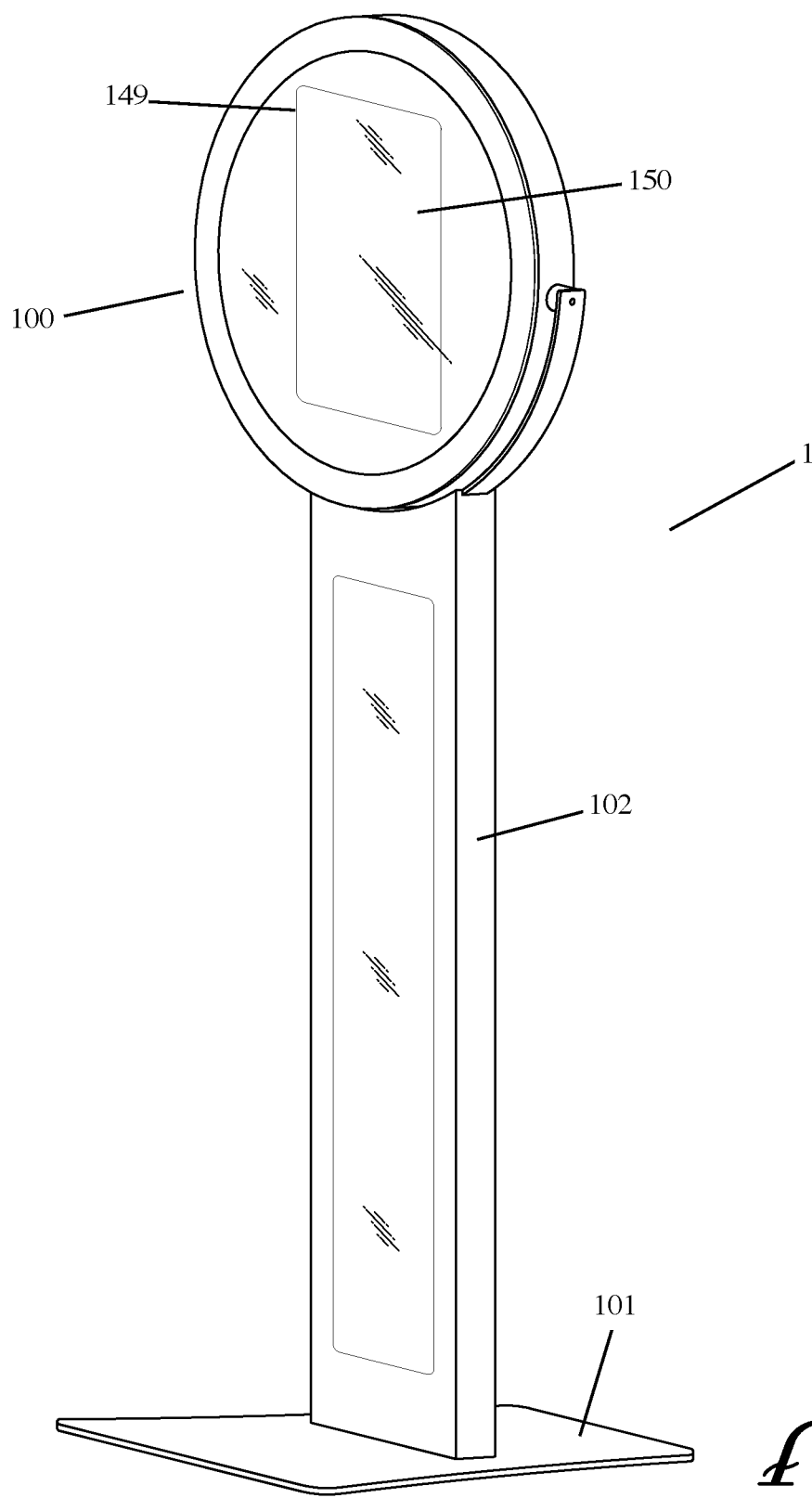
FIG. 1 is a front perspective view of an exemplary embodiment of a photobooth having an apparatus utilizing partial lamination for a seamless interface with touchscreen functionality.

An apparatus 100 utilizing partial lamination to create a seamless interface with touchscreen functionality is provided. FIG. 1 depicts an exemplary embodiment of a portable photobooth 1 utilizing the apparatus 100. While a portable photobooth 1 exemplary embodiment utilizing the apparatus 100 will be described throughout to illustrate the concepts and elements of the invention, this exemplary embodiment of the apparatus 100 is not intended to limit the concepts and elements disclosed or the application of the invention in other contexts where a touchscreen is used such as point of purchase screens.

As depicted in FIG. 1, the portable photobooth 1 includes the apparatus 100, base 101, and stand 102. The apparatus 100 is configured to be positioned above the stand 102 and base 101. Throughout FIGS. 1-4, a touchscreen border 149 is depicted on apparatus 100 to highlight the position of the touchscreen device 150 behind the front member 110. This touchscreen border 149 is preferably not visible behind the front member 110 of the apparatus 100, thus giving the apparatus 100 a seamless front appearance. The front member 110 and other elements of the apparatus 100 are shown in greater detail in the exemplary embodiment depicted in FIGS. 4-6.

Figure 3:
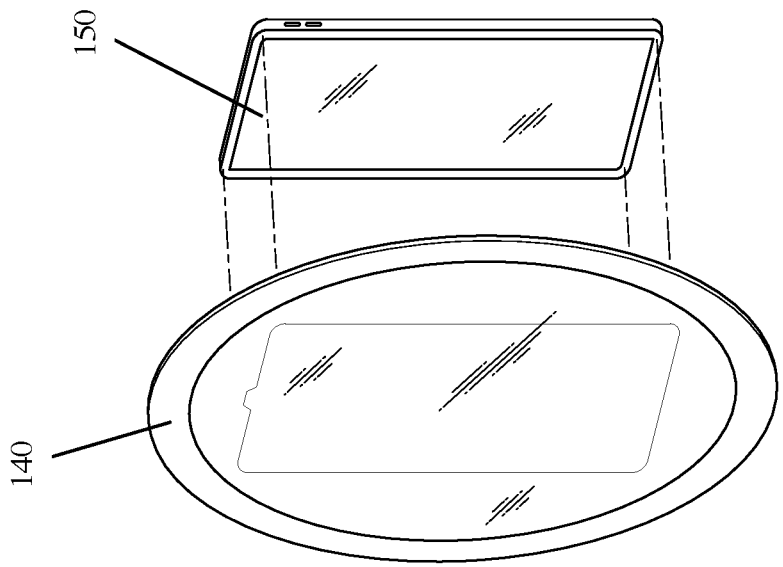
FIG. 3 is a perspective view of a novel method of acquiring touchscreen functionality through a seamless interface.
Figure 2:
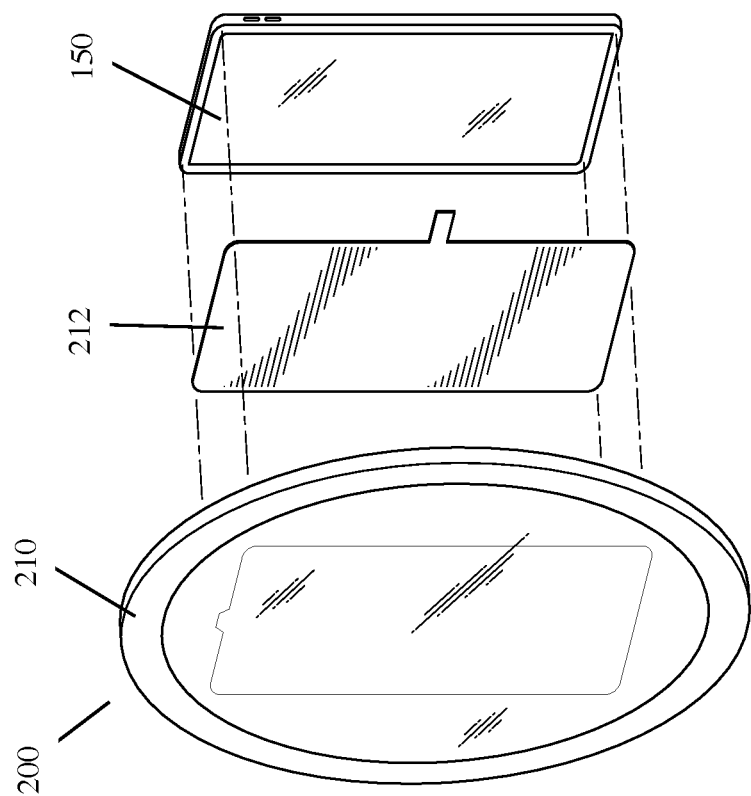
FIG. 2 is a perspective view of a prior art method of acquiring touchscreen functionality through an interface.

FIGS. 2 and 3 illustrate the differences between the prior art method of acquiring touchscreen functionality through a user interface and the novel method and apparatus disclosed. As shown in the prior art interface 200 of FIG. 2, a touch-foil 212 is placed between a user interface 210 and the touchscreen device 150. The touch-foil 212 must be connected to the touchscreen device 150 (typically via a USB connection), have a separate controller board and drivers installed, then calibrated to correctly work with the touchscreen device 150. The touch-foil 212 is generally required due to the thickness of the user interface 210, which must be sufficiently thick to be durable and resilient while being touched by a user. Without the touch-foil 212, the touchscreen functionality of the touchscreen device 150 would not pass through the user interface 210 due to the thickness of the user interface 210, thus preventing any touchscreen capability of the prior art interface 200.

As shown in the novel partial lamination configuration depicted in FIG. 3, the touch-foil 212 is no longer required to enable touchscreen functionality from the touchscreen device 150 through a seamless interface 140. Due to the novel partial lamination configuration disclosed below, the seamless interface 140 is sufficiently thick on the portions not contacting the touchscreen device 150 to remain durable and resilient, while the seamless interface 140 is sufficiently thin on the portions contacting the touchscreen device 150 to permit the touchscreen functionality of the touchscreen device 150 to pass through the seamless interface 140.

FIG. 4 depicts the schematic view of an exemplary embodiment of the apparatus 100. As shown in FIG. 4, the apparatus 100 includes the seamless interface 140, a touchscreen device 150, and a rear member 130. The seamless interface 140 is constructed from a front member 110, adhesive means 112, and a support member 120. The front member 110 may be a thin piece of glass or plastic sheet cut into any shape. In alternative embodiments, the front member 110 may be entirely constructed of a thin piece of glass or plastic, a combination of glass and plastic, or be constructed of a piece of glass and/or plastic surrounded by another material. In embodiments utilizing glass, the glass may be regular, tempered, of specialized impact resistant formation, or any other type of glass. The glass or plastic material may also be of any transparent or opaque type material. The front member 110 may similarly be decorated with paint, be frosted, or be constructed as a one-way mirror (also referred to as a two-way mirror). The terms "one-way mirror" and "two-way mirror" have the same definition provided below and may be used interchangeably.

The front member 110 includes a central area 116, defined by the area inside the touchscreen border 149, configured to directly contact the touchscreen surface 152 of a touchscreen device 150. The central area 116 of the front member 110 is preferably the same size and shape of the touchscreen device 150. The central area 116 is preferably constructed of a material that permits the light of the touchscreen device 150 to pass through such that a user can see and interact with the touchscreen device 150 placed behind the front member 110. For example, in an alternative embodiment, the front member 110 may be a one-way mirror, such that when the touchscreen device 150 is off, the front member 110 appears as a standard mirror, but when the touchscreen device 150 is on, the light of the touchscreen device 150 passes through the one-way mirror, allowing the touchscreen surface 152 of the touchscreen device 150 to be seen.

The central area 116 should be sufficiently thin to permit the touchscreen functionality of the touchscreen device 150 to pass through the central area 116 of the front member 110. In some embodiments, the central area 116 will be between 0.25 millimeters and 3 millimeters thick. In other embodiments, the central area 116 may be of other thicknesses, so long as the touchscreen functionality of the touchscreen device 150 is enabled through the central area 116 of the front member 110. In embodiments where the front member 110 is constructed of a uniform piece of material, the thickness of the front member 110 and central area 116 must be similarly uniform. In other embodiments where the front member 110 is constructed of multiple materials, only the thickness of the central area 116 must be sufficient to enable the touchscreen functionality of the touchscreen device 150 through the central area 116. Due to the flush front and the thin central area 116 of the front member 110, the front of the seamless interface 140 will be flush, thus creating a seamless interface 140 with touchscreen capabilities.

A support member 120 is utilized to support and stiffen the front member 110. The support member 120 may be of similar size and shape as the front member 110. The support member 120 includes a support member opening 124. The support member opening 124 is configured to be the same size or larger than the touchscreen device 150, such that the touchscreen device 150 may be inserted into the supporting member opening 124.

The support member 120 may be constructed of nearly any material so long as the material is sufficient to support, strengthen, and stiffen the front member 110. For example, some embodiments may use glass, plastic, metal, wood, acrylic, PETG plastic, or similar materials as the supporting member 120. Other embodiments may use other materials, so long as they provide sufficient support to the front member 110.

The support member 120 is secured to the front member 110 by an adhesive means 112. The adhesive means 112 may be any type of adhesive sufficient to permanently attach the front member 110 to the support member 120. For example, the adhesive means may be double-sided tape, epoxy, silicone, or any other adhesives sufficient for permanently securing the front member 110 to the support member 120. The adhesive means 112 is only placed on the portions of the front member 110 and support member 120 that contact each other. Thus, the central area 116 of the front member 110 and the support member opening 124 will not be coated with the adhesive means 112. The void in the adhesive means 112 will be referred to as a central void 114. The result of adhering the front member 110 to the support member 120 in this way is to permit the partially laminated seamless interface 140 to accept a touchscreen device 150.

The touchscreen device 150 may be any device that has touchscreen functionality. For example, smart phones, tablets, touchscreen computer monitors, and other similar devices may be incorporated. Additionally, in other embodiments, touchscreen devices 150 incorporating a front facing camera and having software for taking photographs with the front facing camera may be utilized as well. Importantly, the touchscreen device 150 must have a touchscreen surface 152 with touchscreen capabilities.

The rear member 130 is configured to be placed behind the touchscreen device 150 and preferably attach to the support member 120, thus securing the touchscreen device 150 between the front member 110 and the rear member 130. The rear member 130 may be of any shape, size, or configuration so long as it provides sufficient pressure to the backside of the touchscreen device 150 such that the touchscreen surface 152 of the touchscreen device 150 is in complete contact with the front member 110. In other embodiments, the rear member 130 may attach to other portions of the apparatus 100 so long as the rear portion provides the sufficient pressure to the backside of the touchscreen device 150 as discussed above. The rear member 130 may be removably or permanently attached depending on the embodiment. In some embodiments, the rear member 130 may act as a rear cover to the apparatus 100. In other embodiments, such as the exemplary embodiment depicted in FIG. 4, the rear member 130 may be separate and housed inside a cover 132.

II. Description of Method of Manufacture

The general schematics for a method of partial lamination to manufacture an apparatus with a seamless touchscreen interface is also depicted in FIG. 4. First, manufacture a front member 110. Then manufacture a support member 120 of similar shape and size having a support member opening 124 located in the center area of the support member 120. Next, coat the front member 110 and/or the support member 120 with an adhesive means 112 everywhere the front member 110 and support member 120 will contact each other. In some embodiments, only the support member 120 will be coated with the adhesive means 112. In other embodiments, only the front member 120 will be coated with the adhesive means 112 in the areas the support member 120 will contact the front member 110. In alternative embodiments, both the front member 110 and support member 120 will be coated with the adhesive means 112. The area of the front member 110 not contacted by the support member 120 is the central area 116 of the front member 110 that will contact the touchscreen device 150. Then, adhere the front member 110 to the support member 120. This process partially laminates the front member 110, thereby creating a strengthened seamless interface 140 that the touchscreen device 150 can be inserted into.

Next, position the touchscreen device 150 into the support member opening 124 such that the touchscreen surface 152 of the touchscreen device 150 contacts the central area 116 of the front member 110 that is non-laminated. Then, tighten a rear member 130 to the opposing side of the support member 120 from the front member 110. This process secures the touchscreen device 150 in between the front member 110 and the rear member 130. The rear member 130 should contact the backside of the touchscreen device 150. Tightening the rear member 130 to the support member 120 thus places sufficient pressure on the backside of the touchscreen device 150 so the touchscreen surface 152 of the touchscreen device 150 is in complete contact with the central area 116 of the front member 110. This permits a user to utilize the existing touchscreen functionality of the touchscreen device 150 through the non-laminated central area 116 of the seamless interface 140, while the seamless interface 140 maintains sufficient strength and stiffness for practical and commercial use.

In embodiments utilizing a separate cover 132 from the rear member 130, an additional step to the method is required. In these embodiments, once the rear member 130 is tightened to the support member 120, the cover 132 is secured to the seamless interface 140, thereby enclosing the touchscreen device 150 and rear member 130 in the apparatus 100. This additional step is only necessary in embodiments utilizing a separate cover 132.

III. Exemplary Embodiment of the Apparatus

FIGS. 4-6 together depict the exemplary embodiment of the apparatus 100 utilized for a portable photobooth 1. The description of the exemplary embodiment provided below is to illustrate the general concepts previously disclosed, and is not intended to limit the concepts to this exemplary embodiment.

As shown in FIGS. 4-6, the exemplary embodiment of the apparatus 100 includes a front member 110, a slightly smaller support member 120 with a support member opening 124, a rear member 130, and a decorative cover 132 to enclose the entire apparatus 100. In the exemplary embodiment, the cover 132 is a separate member from the rear member 130. The cover 132 is configured to surround the rear member 130 and house the touchscreen device 150 when the touchscreen device 150 is secured between the rear member 130, support member 120, and front member 110 as disclosed above. As depicted in FIGS. 5-6, the cover 132 is configured to adhere to the front member 110 by the adhesive means 112, thereby enclosing the touchscreen device 150 in the apparatus 100.

In the exemplary embodiment, the front member 110 may be a circular piece of transparent, tempered glass. The supporting member 120 may be a circular, transparent plastic material configured to strengthen the transparent, tempered glass of the front member 110. The supporting member 120 is adhered to the front member 110 by the adhesive means 112. The supporting member 120 is configured to be a slightly smaller circular piece than the front member 110 and include a supporting member opening 124 and a plurality of threaded attachment openings 126. As shown in FIGS. 5-6, the adhesive means 112 cover the entire front member 110 except in a central void 114 matching the size and position of the supporting member opening 124. When the supporting member 120 is adhered to the front member 110, the partially laminated seamless interface 140 is constructed.

The touchscreen device 150 is then positioned in the supporting member opening 124 such that the touchscreen surface 152 of the touchscreen device 150 is contacting the front member 110 and not the adhesive means 112. A rear member 130 that is similarly circular in shape is placed behind the touchscreen device 150. The rear member 130 may include at least one rear member pad 134 to contact the rear of the touchscreen device 150.

The rear member 130 has a plurality of attachment openings 136. The plurality of attachment openings 136 are configured to accept a bolt or similar threaded attachment member, which runs through the attachment openings 136 and is capable of threading into the threaded attachment openings 126 of the support member 120. Tightening the bolt or similar threaded attachment member secures the rear member 130 to the support member 120. When tightened, the rear member pad 134 pushes the touchscreen device 150 through the support member opening 124 and against the front member 110, as shown in FIG. 5. The bolt or similar threaded attachment member is not shown in FIGS. 5-6, as they both depict cross-sections of the apparatus 100.

Once the rear member 130 is secured to the support member 120, the cover 132 then surrounds the rear member 130, touchscreen device 150, and support member 120, and is adhered to the front member 110 by the exposed portion of the adhesive means 112. While the exemplary embodiment utilizes the adhesive means 112 to secure the cover 132 to the front member 110, other methods of securing the cover 132 to the front member 110 may be utilized without departing from the concepts disclosed.

Exemplary embodiments of the present invention are described herein with reference to idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing.

We claim:

1. A seamless touchscreen interface apparatus for a touchscreen device, the apparatus comprising:
   a front member;
   a support member having a first opening;
   an adhesive means having a second opening;
   the first opening and second opening configured such that the touch screen device fits through them to rest against a portion of the front member;
   wherein said adhesive means adheres said front member to said support member in all areas except said first opening; and
   a rear member comprising at least one rear member pad, the rear member pad configured to press the touch screen device against the front member;
   wherein the front member and the rear member are in peripheral contour.

2. The apparatus of claim 1, wherein the rear member comprises at least one first attachment opening and the support member comprises at least one second attachment opening, the first attachment openings and the second attachment openings being in alignment.

3. The apparatus of claim 1, further comprising:
   a cover, wherein said cover is secured to said seamless touchscreen interface, thereby enclosing said touchscreen device and said rear member.

4. The apparatus of claim 1, wherein said front member is between 0.25 millimeters and 3 millimeters thick.

5. The apparatus of claim 1, wherein said front member is between 0.5 millimeters and 2 millimeters thick.

6. The apparatus of claim 1, wherein said front member is tempered glass.

7. The apparatus of claim 1, wherein said front member is a one-way mirror.

8. The apparatus of claim 1, wherein said support member is constructed of acrylic.

9. The apparatus of claim 1, wherein said touchscreen device is in complete contact with the portion of said front member exposed by said first opening of said support member.

10. The apparatus of claim 1, wherein said touchscreen device is a tablet having a front facing camera and photograph capabilities.

11. The apparatus of claim 1, further comprising a stand and a base, wherein said apparatus is configured to be mounted on said stand, and wherein said stand is supported by said base.

12. A method of manufacturing a seamless touchscreen interface apparatus for a touch screen device, the method comprising:
   manufacturing a front member;
   manufacturing a support member, having a first opening;
   coating said support member with an adhesive means having a second opening;
   configuring the first opening and the second opening such that the touch screen device fits through them to rest against the front member;
   adhering said front member to said support member in all areas except the first opening;
   providing a rear member comprising at least one rear member pad, the rear member pad configured to press the touch screen device against the front member; and
   configuring the front member and the rear member in peripheral contour.

13. The method of claim 12, further comprising the step of:
   configuring the rear member with first attachment openings, configuring the support member with second attachment openings, wherein the first attachment openings and the second attachment openings are in alignment.

14. The method of claim 13, further comprising:
   securing a cover to said seamless touchscreen interface, thereby enclosing said touchscreen device and said rear member.

15. The method of claim 13, wherein said touchscreen device has a front facing camera and photograph capabilities.

16. The method of claim 12, wherein said front member is manufactured out of tempered glass.

17. The method of claim 16, wherein said tempered glass is between 0.25 millimeters and 3.0 millimeters thick.

18. The method of claim 12, wherein said support member is manufactured out of acrylic.

\* \* \* \* \*